United States Patent [19]

Kausel et al.

[11] 4,152,143

[45] May 1, 1979

[54] METHOD AND APPARATUS FOR PRECIPITATING METAL CEMENT

[75] Inventors: Ernst Kausel, Lima, Peru; Reinhard Nissen, Cologne, Fed. Rep. of Germany

[73] Assignee: Klöckner-Humboldt-Deutz Aktiengesellschaft, Fed. Rep. of Germany

[21] Appl. No.: 868,981

[22] Filed: Jan. 12, 1978

Related U.S. Application Data

[63] Continuation-in-part of Ser. No. 721,567, Sep. 8, 1977, abandoned.

[51] Int. Cl.² ............................................. C22B 15/12
[52] U.S. Cl. ...................................... 75/109; 75/117; 75/118 R; 75/119; 75/121
[58] Field of Search .................... 75/109, 117, 118 R, 75/119, 121

[56] References Cited

U.S. PATENT DOCUMENTS

| | | | |
|---|---|---|---|
| 860,661 | 7/1907 | Hendryx | 75/109 X |
| 1,575,160 | 3/1926 | Giertsen | 75/109 X |
| 3,457,035 | 7/1969 | Barker | 423/604 |
| 3,674,466 | 7/1972 | Anderson et al. | 75/109 |
| 3,748,124 | 7/1973 | Case et al. | 75/109 |
| 3,874,940 | 4/1975 | Vera et al. | 75/117 X |

FOREIGN PATENT DOCUMENTS 100588 11/1916 United Kingdom ................. 75/109

Primary Examiner—G. Ozaki
Attorney, Agent, or Firm—Hill, Gross, Simpson, Van Santen, Steadman, Chiara & Simpson

[57] ABSTRACT

Improved method adapted for the continuous precipitation of metal cement (especially copper cement) from an aqueous solution of a first metal (such as copper) mixed with pieces of second metal (such as iron) which is less noble than such first metal. The first metal cement depositing on the second metal pieces is loosened therefrom by means of constant but regulated movement of such pieces, and is separated and collected from the mixture.

9 Claims, 2 Drawing Figures

METHOD AND APPARATUS FOR PRECIPITATING METAL CEMENT

RELATED APPLICATION

This application is a continuation in part of copending U.S. Ser. No. 721,567 filed Sept. 8, 1977, now abandoned.

BACKGROUND OF THE INVENTION

In the precipitation of metal, in the form of metal cement, from a solution of the metal mixed with less noble metal as precipitant, i.e. the so-called "cementation", essentially similar steps always take place—without reference to what metals are involved in detail, whereby an exchange takes place between a more noble and a less noble metal, according to electrochemical series.

The term "cementation" is defined according to the work "Lexikon der Huttentechnik" (Lexicon of the Foundry Technique) by Luger, 4th Edition, 1963, Volume 5, Deutsche Verlagsanstalt Stuttgart, page 733, as follows:

Precipitation of a metal out of a solution by means of a less noble metal. The less noble metal possesses a more negative potential than the one to be precipitated, puts positively charged ions into solution, charges itself negatively thereby and discharges all cations with more positive potentials. Precipitation in metallic form. Thus, the potential difference in the different cations under the prevailing conditions is decisive.

The metal cement product is in the form of a finely divided particulate precipitate.

In cementation- or precipitation-processes of various metals, fundamental difficulties occur in that the precipitated metal, the so-called cement metal, coats the surfaces of the less noble metals used as precipitants and thus impedes or actually brings to a standstill the electrochemical reaction, that is, the ion exchange. Other hindrances for the course of the reaction result from the fact that either an oxide layer is formed on the surface of the metallic precipitant, or a coating of fine gas bubbles which are derived from electrolytic procedures results.

Thus, the precipitation of copper from a copper solution (prepared, for example, by leaching of a mined copper ore, or a copper oxide dump, or the like, with a weak inorganic acid, such as sulfuric or hydrochloric acids) takes place in the presence of iron on account of the electromotive difference between copper and iron according to the known exemplary reaction equations:

$CuSO_4 + Fe \rightarrow FeSO_4 + Cu;$

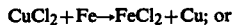

$CuCl_2 + Fe \rightarrow FeCl_2 + Cu;$ or

$2\ CuCl + Fe \rightarrow FeCl_2 + 2\ Cu.$

The precipitated copper is termed "cement copper". The iron ordinarily is added to such solution in the form of sheet-iron scrap, cast iron bars, or iron sponge. In achieving precipitation, it is important that the surface of the iron be constantly kept clean; that is, the precipitated copper should be constantly separated from the iron, so that further copper may precipitate thereon. Towards this end, the iron pieces need to be kept constantly in motion.

It was previously usual in the zinc-wet-metallurgy field that the precipitating neutral solutions were freed from foreign metals dissolved therein, such as, for examples, Cu, Cd, Co or Ni. Thus, to a starting solution was added in agitators metallic zinc powder, and such mentioned impurities were thus precipitated out. Such known method however, has among others, the disadvantage that, first, for example, by means of spraying of metallic zinc, the zinc powder must be produced. In addition, the reaction progresses between the precipitating powder and the solution extremely slowly, with a reaction duration up to many hours, especially for the reason that a layer of zinc oxide forms on the zinc particles which decisively retards the progress of the reaction.

In the case of the known copper cement precipitation techniques, iron piece movement has been sought by various means. Thus, in one apparatus, an agitator device is installed in the precipitation container. In another apparatus, the iron is automatically introduced, or rather introduced into, automatically moved baskets or rockers made of copper or wood. In another apparatus, the precipitation is accomplished in rotating, acid-proof lined iron drums. When in such last apparatus, a certain acceleration of the course of the reaction can be attained, then, for example, with a precipitation drum of approximately 30 m$^3$ of utilizable volume, it always takes about 1 hour or more until the copper is precipitated out to a desired copper residue content below about 0.1 g/l in the final decopperized solution, which is a convenient upper level in the cement copper production field for copper in a decopperized solution, as those skilled in the art appreciate.

German patent application No. G 105,641 VIa dated June 30, 1942 describes a device for batch copper cementation using a cylindrical upright container open at the top and provided with an oscillating drive. The container is pre-charged with iron pieces, and copper solution is injected at the container bottom during oscillations, and the decopperized solution is conveyed off through simple overflow from the open rim of the container. The rim carries a ring of filter stones to prevent iron particles from leaving the container.

BRIEF SUMMARY OF THE INVENTION

More particularly, the present invention provides an improved technique for obtaining cement metal which overcomes these known difficulties and improves the economy and also the output of metal produced by cementation so that total process efficiency is surprisingly improved.

In accord with the present invention, when a preformed aqueous medium having dissolved therein salts of a first metal to be precipitated is contacted with pieces comprised of a second metal which is less noble than such first metal, such pieces are shaken at such a frequency and amplitude that deposits of metal so precipitated upon such pieces are loosened therefrom. Such contacting and such shaking are preferably conducted in a continuous manner, and the metal cement product is removed regularly from the zone of such contacting and shaking.

In one aspect, this invention is directed to an improved method for the precipitation of a first metal cement, for example, copper cement, from an aqueous first metal solution mixed with pieces of a second metal, for example, iron, whereby the cement metal depositing on such pieces of second metal is loosened therefrom by means of constant movement of such pieces of second metal and is removed from the resulting, first metal depleted solution. The pieces of second metal are shaken in such first metal solution with vibrations having a frequency and amplitude such that the pieces constantly strike against one another. The pieces of second metal used are preferably charged in the form of granulates into a first metal solution in a vibrating zone. The method is preferably practiced continuously.

In another aspect, this invention is directed to improved apparatus for producing metal cement (such as copper cement) utilizing the method of this invention. This apparatus employs an elongated container having a generally uniform cross-sectional configuration which is horizontally oriented and supported by vibration means. This container has one or more charging openings in or adjacent one end thereof from the charging thereto of preformed first metal aqueous solution such as a copper solution and one or more charging openings in or adjacent the opposed end thereof for the charging of pieces of second metal (such as iron) thereto. A discharge opening for the removal of first metal depleted solution (such as decopperized solution) therefrom is located in or adjacent such opposed end thereof. The first metal cement particles are removed from the container through the discharge opening with the first metal depleted solution in the form of a slurry.

An object of this invention is to provide an improved method for making metal cement, especially copper cement.

Another object of this invention is to provide apparatus useful for the practice of such improved technique.

Another object of this invention is to provide an improved continuous technique for metal cement production utilizing a container vibrating at a predetermined, controlled frequency and amplitude in combination with a countercurrent flow of first metal solution relative to pieces of second metal where the second metal is less noble than the first metal.

Another object of this invention is to provide an improved technique for metal cement production of the type indicated above wherein the flow of the first metal solution from charging to discharge extends through a bed of second metal pieces in the shaking zone which pieces decrease in size with increasing distance from the point of charging of such first metal solution so that a filtering action occurs along the path of flow of first metal solution which enhances separation of first metal cement from second metal pieces.

Another object of this invention is to provide an improved technique for metal cement production of the type indicated above wherein acid is mixed with the first metal depleted solution at, near, or in the region of the discharge thereof from the zone of such shaking which, in effect, enhances the filtering action above referenced.

Other and further objects, purposes, advantages, aims, utilities, features and the like will be apparent to those skilled in the art from a reading of the present specification taken together with the drawings.

DETAILED DESCRIPTION

Figure 1:
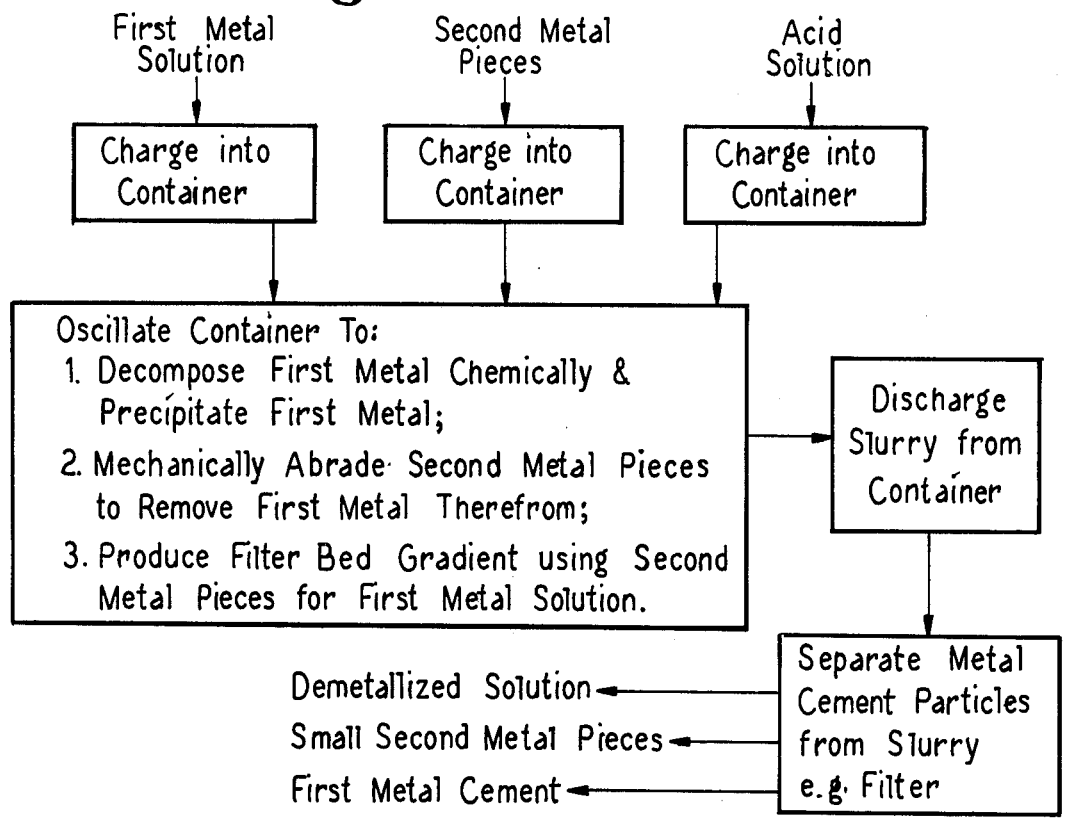
FIG. 1 is a diagrammatic flow sheet illustrating a preferred mode of practicing a technique of the present invention.

Referring to FIG. 1, there is seen a flow diagram illustrating a preferred practice of the present invention, this diagram is believed to be largely self-explanatory and to need no further detailed explanation herein in the light of the description of the invention provided herewith.

In accordance with the present invention, pieces of second metal (e.g., iron) are shaken with vibration or oscillation at such a frequency and amplitude that such pieces constantly strike against one another in a first metal solution (e.g., a copper solution). By means of such an intensive shaking movement of such pieces, the surfaces of such pieces covered with precipitated metal cement are immediately rubbed and knocked substantially clean of first metal deposited thereon so that these surfaces are thereby again available for further reaction and deposition of more first metal thereon. By means of such intensive mixing, simultaneously, the first metal ion concentration in treating solution in the area of second metal surfaces is apparently less than it is in conventional prior art metal cement production methods. The present invention in one aspect thus accelerates the rate at which metal cement is precipitated from a given solution.

Also, the present invention permits a somewhat greater volumetric degree of precipitation than was previously achieved in prior art precipitation drums in metal cement production.

The metal pieces required for the precipitation reaction may be added in any convenient form such as sheet metal segments, stamping scrap bunches, granulated metal, porous metal, or the like. Granulated metals, however, tend not to have as large a specific surface area as does sheet metal scrap, but granulates have the advantage that, on account of their characteristically more or less rounded off shapes, they typically may be shaken better in an apparatus of the present invention. By means of iron granules, a constant intermixture and rotation of granules takes place within a reaction vessel of the present invention which appears to enhance the desired precipitation of cement metal. In the practice of the present invention it is convenient and preferred to employ metal pieces having average particle size ranging from about 2 to 10 millimeters, though larger and smaller sizes of pieces may be employed as those skilled in the art will appreciate.

The aqueous medium employed as a first metal starting solution in the practice of this invention preferably contains initially at least about 500 milligrams per liter, and more preferably at least about 30 grams per liter, of dissolved first metal to be precipitated as metal cement. Typically, after such contacting as is accomplished by the teachings of this invention, the resulting aqueous medium contains not more than about 100 milligrams per liter of remaining dissolved first metal, and preferably not more than about 40 milligrams per liter of such first metal.

A preferred contact time period between aqueous medium and metal pieces ranges from about 15 to 200 seconds. Preferably the contact time period is regulated while practicing other process conditions indicated herein so that not more than about 1.5 times the stoichiometric quantity of metal pieces is used to produce a given cement metal product. Conveniently, at the end of a contacting period, the resulting aqueous medium is separated from the metal pieces.

Convenient separation procedures known to those skilled in the art can be employed, such as filtration, centrifuging, electromagnets, and the like.

Since solutions of metal salts suitable for use as starting materials in the practice of this invention are well known to the prior art, no detailed description thereof is given herein.

Figure 2:
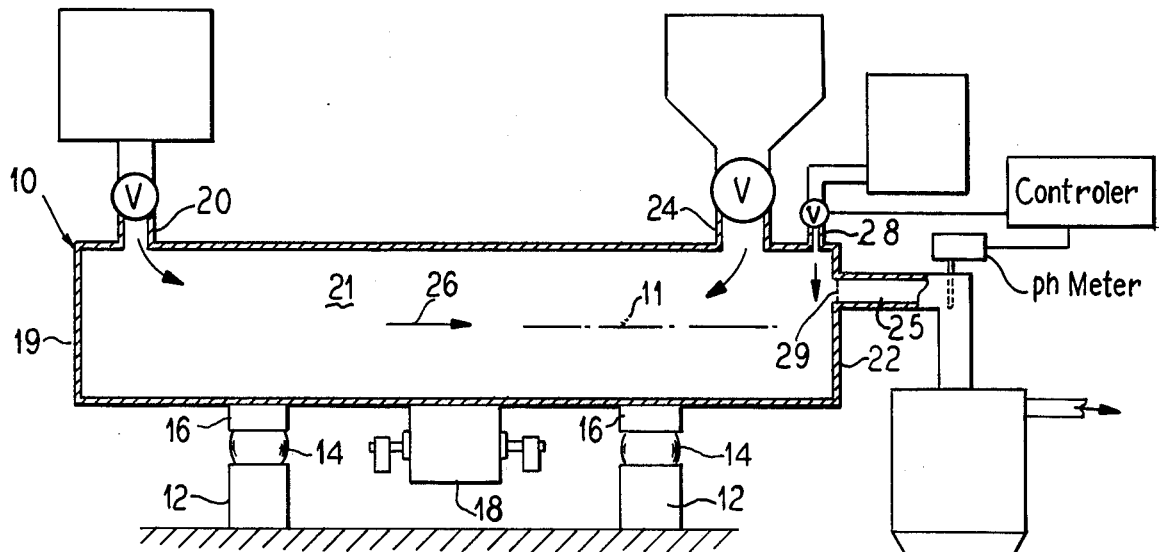
FIG. 2 shows a schematic longitudinal sectional view through one embodiment of apparatus of the present invention wherein the method of the present invention is practicable.

Referring to FIG. 2, there is seen container 10 which is here cross sectionally circular and of generally uniform internal configuration along the length (or axis 11) thereof. While container 10 is circular, it will be appreciated that any convenient cross sectional configuration could be employed, such as an elliptical shape, or the like, as desired. Preferably container 10 has an axial length which is at least twice the maximum cross sectional distance transversely across the interior thereof, and more preferably at least five times such distance.

The weight of container 10 (and its contents, during operation) is supportable by columns 12 (paired). On the top of each such column 12 is an elastomeric cushion 14 (paired). A pair of posts 16 depend from the bottom portion of the circumferentially extending side wall 17 of container 10, and each post 16 is adapted to matingly engage and rest upon a different one of the cushions 14.

A conventional rocking or oscillating drive assembly 18 is mounted functionally to the bottom portion of side wall 17 intermediately between the posts 16. Drive assembly 18 can be similar to that employed, for example, in a ball mill, or the like, if desired. In operation, oscillating drive assembly is preferably adapted to move container 10 through a circular path such that the center of mass of container 10 rotating or circulating through the diameter of the oscillation which is here normal to axis 11.

Adjacent one end wall 19 of container 10 an inlet line 20 is connected through an upper portion of side wall 17. Line 20 is adapted for the input of an aqueous solution of a first metal into the interior 21 of container 10. Adjacent the opposed end wall 22 (relative to end 19) of container 10 an inlet line 24 is connected through an upper portion of side wall 17. Line 24 is adapted for input of pieces of a second metal into the interior 21 of container 10. A discharge line 85 is connected through an upper portion of end wall 19. Discharge line 25 is always located in a proximate but spaced relationship to inlet line 24, and line 25 may be located in side wall 17. If desired, lines 20 and 24 may be connected to container 10 through respective end walls 19 and 22. Lines 20 and 24 are characteristically located at opposite end regions of container 10.

An aqueous solution of a first metal (in the form of a salt or salts of the metal) is fed into interior 21 through line 20 preferably continuously, through discontinuous (intermittant) or variable solution feed rates are possible, as those skilled in the art will appreciate. Pieces of a second metal are fed into interior 21 through line 24 preferably continuously, though discontinuous (intermittant) or variable piece feed rates are possible as those skilled in the art will appreciate. The second metal is less noble than the first metal.

The first metal solution charged into interior 21 through line 20 flows through container 10 generally in the direction of arrow 26 and becomes first metal poor, or increasingly depleted of first metal, as it moves through container 10 owing to reaction with second metal pieces and generation of metal cement. As container 10 oscillates, as a result the flowing movement of first metal solution, and also as a result of the chemical and mechanical decomposition of the second metal pieces (sometimes termed the precipitant), a particle size distribution of second metal pieces is produced along the axis 11 of container 10 with the result that the specific surface area of second metal pieces increasing in the direction of the discharge line 25. Thus, proceding in this direction from the input line 20, a "filter" with decreasing pore size is built up. As a consequence, the first metal solution which is flowing towards line 25 and is becoming increasingly first-metal poor encounters second metal pieces (precipitant) with an overall increase in surface. Thus, by the inventive arrangement of the supply of precipitant and metal solution optimal process technology conditions are achievable for a maximization of metal cement precipitation.

By means of the flow of first metal solution particularly the smaller particles of precipitant are conveyed into the discharge region of container 10 near line 25, that is, into a region where the relatively coarse grained fresh precipitant is introduced. A specificable particle size dependent portion of the smaller particles of precipitant (second metal pieces) is discharged together with the metal cement with first-metal poor solution from (through) discharge line 25. The remaining part of the smaller particles of second metal is prevented from an immediate egress from the rocking container 10 by the relatively more coarsely grained portion of the freshly supplied precipitant (second metal pieces).

In the vicinity of discharge line 25, an inlet line 28 is preferably connected through an upper portion of side wall 17. Line 28 is adapted for the input of aqueous acid into depleted first metal solution as such leaves the interior 21 of container 10. If desired, line 28 may be connected to container 10 through end wall 22, or line 28 may be connected to line 25 near where it joins end wall 22. By means of acid feed-in in the discharge area of the vibrating container 10 a pH value is established, such that the filterability of the discharged product stream is assured. In addition to the precipitating reaction, in which a metal from the first metal-solution, on account of its electrochemically more noble character, deposits itself on the precipitant (or second metal pieces), and, simultaneously, reactions also take place between the metal of the precipitant and the acid portion of the solution (i.e. the first metal solution which is characteristically acidic). From the latter reactions, there ensues, in addition to the precipitant consumption, also acid consumption, and thus, viewed as a whole, there is an increase in the pH value of the discharged product liquid. This means, that the chemical character of the discharge product is altered in the direction of increasing basicity, so that a subsequent filtration of such discharged product can cause difficulties.

As was learned in tests and evaluations, neither an increase in the pH-value of the charged metal solution nor a charging of acid, for example, in a central zone of the vibrating or rocking container 10, has an appreciable effect upon the pH-value of such discharged product. The reason on this effect apparently has its origin in the high speed of conversion between acid of metal solution and precipitant.

It has, as a whole, been found expedient in the practice of the present invention to regulate the pH value of the discharged materials by means of adding acid directly into the discharge region of container 10. The acid and precipitant consumption is essentially based on the formation of passivating layers (for example, sulfates) on the surface of the precipitant, with hydrogen being released. However, in the vibrating container 10, because of the oscillating movement and the particles of the precipitant striking against one another in this manner these passivating layers are destroyed again. An increased supply of acid, together with, for example, the first metal-solution, or separately charged into in the central area of the vibrating container 10, accordingly has hardly any influence on the pH value of the discharge product.

An addition of acid in the discharge region, on the contrary, shifts the reactions between acid and precipitant into a region or zone in which the materials reacting with one another are still subject to the vibrating movement for only a short time, or even not at all. In this area, particularly directly after leaving the vibrating container 10, a chemical reaction between the precipitant and the acid finally comes to a stop because of the formation of passivating layers. Thus, by the adding of acid, the establishment of a specified pH value of the discharge product in the discharge area may be effectively achieved. In this manner, even with otherwise difficult cases, the subsequent filterability of a discharged product is assured.

For the attainment of a specified pH-value of the materials discharged via the discharge line 25 aqueous acid is added to the vibrating container 10 as indicated via line 28. At this location, i.e. in the region of line 28 and line 25, there occurs an increasing passivation of the precipitant, so that chemical conversions between acid and precipitant, particularly after leaving the vibrating container 10 are largely prevented as desired. The pH value of the discharged materials which has been established in this manner, assures their satisfactory subsequent filterability.

In container 10, preferably the bottom portion of side wall 17 is linear (i.e., straight) longitudinally relative to the container 10. Container 10 itself is mounted for desired vibrating movements with such bottom portion of side wall 17 extending preferably horizontally or being slightly inclined with the end 19 being slightly higher than the end 22. One or more charging openings for the first metal solution or for the pieces of second metal can be used, and one or more charging openings may be employed for charging acid solution in the discharge region. Across line 25 at its entrance from interior 21 a grate or screen 29 is positioned for holding back from such opening pieces of second metal. The size of apertures in screen 29 is, of course, large enough to permit particles of metal cement to pass easily therethrough with solution being discharged through line 25.

The intensive shaking movement utilized in the practice of the present invention causes intensive liquid turbulance. An intimate intermixture of solid metal pieces and liquid phases is effected particularly in interfacial regions. Characteristically, ion concentration remains in the region of the surface of the precipitant appreciably greater than with conventional prior metal cement precipitating methods. As a result, the transfer of material and the production of cement metal is promoted. Also, hydrogen gas released during the course of the reaction tends to be emulsified as fine bubbles and to remain in the discharge solution and such action may itself appreciably improve the efficiency of reduction and the production of metal cement.

In general, the frequency of oscillations employed in the practice of the present invention is at least 8 hertz with a vibration frequency of about 10 to 15 hertz being preferred. The oscillation amplitude (preferably the diameter thereof) is at least about 4 millimeters and can range up to about 25 millimeters with amplitudes in the range of from about 8 to 15 millimeters being preferred.

Reaction temperatures in the oscillating zone range from about 18° to 120° C. and more preferably range from about 60° to 95° C.

Preferably the container wherein oscillations are conducted is initially charged and maintained to a fill level volumetrically of over about 50% thereof but under about 90% thereof. However, greater and lesser fills can be employed if desired.

In one preferred operational mode the invention involves the production of copper cement from an aqueous starting copper solution and pieces of iron are charged into a reactor such as reactor 10 and decopperized solution is removed from line 25 together with copper cement. Preferably the charging of starting copper solution is conducted at a rate such that decopperized solution can be continuously withdrawn from the chamber 10 during a normal continuous operation. Preferably the combination of starting copper solution and pieces of iron are added at a rate sufficient to maintain the zone filled to a level of about 70% of its total volume.

In another mode, pieces of zinc metal are used for the precipitation of such relatively more noble metals as copper, cadmium, cobalt, nickel and the like in so-called zinc wet metallurgy. Also, pieces of zinc metal are used for the precipitation of such relatively more noble metals as silver or gold as metal cement from cyanide solution.

For example, with this invention, in contrast to the usual state of the art, as precipitant, instead of zinc powder, zinc pieces are added to a starting metal salt solution. In addition, the entire precipitation process for metal cement production is conducted using an intensive shaking movement so that the pieces of zinc constantly strike against one another.

Through the intensive shaking movements of pieces of zinc thus achieved in accordance with the practice of this invention there is attained a constant pounding and rubbing smooth of the surfaces of the individual zinc pieces present which are characteristically being continuously coated or covered with a deposit of more noble metal being precipitated out of solution. Thus, these zinc particle surfaces remained continuously active for a desired continuous reaction being brought about through ion exchange with such particles remaining in contact with the solution being treated for metal cement production.

In the case of wet zinc metallurgy, an improvement in process economy is achieved in that metal cement can be made from an inexpensive waste and intermediate particulate zinc material, such as is derived from waste metal, dross, slags, or the like, occuring in a metallurgical process, instead of having to use an expensive zinc metal powder, such as done in the prior art. Thus, among other industrial usages of zinc, there is produced in the smelting and casting of zinc cathodes recovered by electrolysis, metal wastes or dross which consist only partially of metallic zinc. Such metal wastes or dross formally had to be worked up by techniques involving segregation of the zinc, whereby the segregation-residues of a zinc solution were conveyed back and there brought into solution. All of these expensive preparatory steps become superfluous and may be omitted in metal recovery operations if, according to the teachings of the invention, the precipitation is undertaken not with expensive zinc powder, but with metal wastes or dross, wastes, granulates or other granular or particle-size parts made of metallic zinc in a swinging container. Zinc surfaces are kept free from impurities and coatings thereon in accordance with the practice of the present invention and its oscillatory characteristics whether such coatings be comprised of oxides, salt deposits, metal cement deposits, or collections of gas bubbles. Thus, an accelerated transfer of material is insured on account of rapid and continuous exchange between metals and solution.

The surface cleansing action achieved by the practice of the present invention leads to an appreciable shortening of the course of a batch or continuous precipitation of more noble metal processes, and beyond this, to a better utilization of the introduced less noble metallic substances whose use is reduced approximately to stoichiometric value contrary to the experienced realized in conventional metal cement precipitation drums where 500% of the stoichiometric quantity of less noble metal may be used for a given process.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

In the following, the invention will be explained in greater detail on the basis of some examples of utilization, whereby two examples of a cementation according to the state of the art and two examples of precipitation processes according to the invention are prepared.

EXAMPLE 1

Example of a precipitation according to the state of the art:

A solution contains in solution through chlorinating volatilization metal compounds recovered from a complex iron ore, with the following contents: 25 g/l; 3 g/l Fe; 80 g/l Zn; 1 g/l Pb; 1 g/l As; remainder Bi, Co, Cd, Ag, circa 200 mg/l.

Into a precipitation drum with circa 100 m$^3$ of capacity are filled circa 30 m$^3$ of the solution with the dissolved metals. The precipitation drum is a pear-shaped, inclinedly positioned acidproof lined vessel rotatable about its axis. By means of the upper opening, there are introduced out of the solution circa 50 t Fe-scrap iron or scrap metal. At a temperature of 50° C., the charge is moved for circa 120 minutes by means of rotation of the vessel. The result is an end solution of circa 380 mg/l Cu. The use of scrap iron or metal in the case of this discontinuous method amounts to circa 215% of the stoichiometric quantity of Fe.

EXAMPLE 2

Example of a conventional cementation:

For the neutral solution in zinc metallurgy, there is received a neutral solution which outside of the dissolved zinc oxides has varying quantities of dissolved ions of electrochemically more noble metals, as above Cu; Ni; Co; and Cd.

These foreign metals to be regarded as impurities compared with the zinc metal to be recovered must be precipitated out of the solution, as already small quantities thereof would act most disadvantageously upon the subsequent electrolysis of the zinc.

The precipitation of these metallic impurities takes place with Zn-dust, as the mentioned impurities are electrochemically more positive than the cementation medium. The cementation is for the purpose carried out in steps, so that the resulting fractions of the cementate may be treated further.

The cementation takes place discontinuously in an agitating vessel, whereby the Zn-dust is added chargewise. The introduced solution contains: 150 g/l Zn; 500 mg/l Cu; 400 mg/l Cd; 20 mg/l Ni; 20 mg/l Co.

The solution is subjected in the first step at 95° C. to the precipitation process with addition of Zn-dust, CuSO$_4$ and arsenictrioxide to the precipitation process, whereby Cu, Co, Ni, As cement, while the Cd remains in solution.

The durations of both cementation steps amount to circa 260 minutes. The use of Zn-dust amounts to 54% of the stoichiometric, theoretical Zn-quantity. Result:

In the purified neutral solution, are found the following residual contents in impurities: Cu 0.1 mg/l, Co 0.2 mg/l, Ni 0.05 mg/l, Cd 0.2 mg/l.

EXAMPLE 3

Example of a cementation according to the invention:

A copper solution made from oxidic copper-ore-concentrate is cemented by means of iron scrap as precipitation means. The cementation operation is carried out in a test arrangement with the aid of a ball-mill, having a shaking mechanism rates of rotation, and whose amplitude are adjustable. A heatable satellite vessel was attached to the grinding tube of the ball mill to obtain information about feasability and about the most favorable operating parameters of the invention. This satellite vessel is thus rigidly attached to the grinding tube of the ball mill so that, during operation this satellite vessel is moved with the grinding tube of the ball-mill, and, is thus set into elliptical or circular oscillations, so that essentially the same oscillation conditions of movement for metal cementation prevail in the satellite vessel interior, as are also present in the grinding tube of the associated ball mill. Note that when there is, for example, a circular oscillation, the satellite vessel carries out no rotary movement. Instead, only its center of gravity is deflected, compared to a stationary point, by an amount of about half the oscillation diameter, with the center of gravity of the satellite vessel circulating or rotating on this oscillation circuit. In the process, however no rotational motion of the satellite about its center of gravity occurs.

The copper solution is continuously charged adjacent one end of the satellite vessel and the iron scrap is continuously charged adjacent the opposite end thereof.

The satellite vessel has a filling volume of 8.5 dm$^3$ and is filled with copper solution and iron scrap to a volume of about 5.5 dm$^3$ or about 65% of vessel volume. Of this volume, about 35% comprises copper solution or about 3 dm$^3$.

The copper solution is comprised mainly of CuSO$_4$ and has a starting dissolved copper content of 36 grams per liter. The amplitude of oscillation is about 10 mm and the frequency of oscillation is about 12.5 Hz. The temperature of the vessel contents is maintained at about 18° C. and the residence time of solution in the oscillating vessel is about 180 seconds before decopperized solution (as a slurry) is removed from such opposite end of the vessel in the upper area thereof in spaced but adjacent relationship to the charging location for the iron scrap.

After separation by filtration of copper cement particles (and residual small iron pieces) from the removed solution, it is found that the recovered solution has a dissolved copper content of 40 mg/l.

In a parallel test under rigidly equal conditions, but however, at a treatment temperature of 63° C., a residual content of 40 mg/l Cu results after 32 seconds.

The use of iron scrap results in both cases in values which correspond to 1.2-times the stoichiometric quantity of iron.

EXAMPLE 4

Example of a cementation according to the invention:

In the same test reactor vessel of Example 3, mounted on the ball mill, the cementation of copper with zinc granulate out of a zinc neutral-solution is carried out.

The content of dissolved copper amounts at the beginning of the reaction at 150 g/l zinc to circa 500 mg/l Cu.

Treatment temperature is 95° C.—the solution pH is 4.

The zinc granulate used as precipitation means lies in the size range of from about 3 to 10 mm.

The vibration is carried out with an amplitude of 10 mm. at 12.5 Hz.

After 29 seconds, cementation time, an end copper content of less than 0.1 mg/l Cu is found by analysis.

EXAMPLE 5

When to the respective recovered decopperized slurry of Example 3 is added sufficient aqueous sulfuric acid to lower the pH to a value of about 5.5, it is found that chemical conversions between iron pieces and recovered solution are substantially stopped. Such result assures the filterability of the recovered slurry.

Further applications of the principles and teachings of the method of this invention to other desired processes of cementation operations in the field of wet-metallurgy, come under this invention, when practiced as taught herein.

We claim:

1. In a method for the precipitation of metal cement from a metal-solution mixed with a precipitant, wherein an aqueous solution of a first metal in salt form is contacted with pieces of a second metal, the second metal being less noble than the first metal in the electromotive series, the improvement which comprises conducting such precipitation in a chamber which is oscillating at a frequency of at least about 8 Hz and discharging from such chamber an aqueous suspension containing metal cement particles while adding to such suspension during such discharging sufficient acid to substantially prevent chemical reaction between such metal particles and other components present in such suspension.

2. The method of claim 1 wherein said oscillating occurs at an amplitude diameter ranging from about 4 mm to 25 mm.

3. The method of claim 1 wherein said method is carried out in said chamber at a temperature of from about 20° to 120° C.

4. The method of claim 1 wherein said second metal pieces are in the form of granulate lumps.

5. The method of claim 1 wherein said first metal solution and said second metal pieces are fed to said chamber at respective opposite ends thereof.

6. The method of claim 1 wherein an acid is added in the discharge area of said chamber container to establish a pH-value such that the filterability of the discharged product is assured.

7. A process for the preparation of cement metal comprising the steps of
(A) simultaneously
  (1) contacting in a horizontally elongated zone having a generally uniform cross-sectional configuration and having a length at least twice the average cross sectional dimension an aqueous medium having dissolved therein salts of metal to be precipitated, said medium initially containing at least about 500 milligrams per liter of said metal to be precipitated with pieces comprised of metal less noble than such metal to be precipitated, said pieces being at least about 2 millimeters in average particle size, said zone being initially charged volumetrically with over about 50% of the volume of said zone with said pieces, and with less than about 50% but greater than about 25% of said volume with said aqueous medium,
  (2) maintaining said medium at a temperature from about 20° to 120° C.,
  (3) continuously vibrating said ball mill zone at a frequency of from about 8 to 20 hertz at a rotational oscillatory amplitude of from about 4 to 25 millimeters,
(B) and then separating the resulting said aqueous medium from the resulting said pieces after a contacting time ranging from about 15 to 200 seconds while separating from such chamber an aqueous suspension containing metal cement particles while adding to such suspension during such separating sufficient acid to substantially prevent chemical reaction between such metal particles and other components present in such suspension.

8. The process of claim 7 wherein said medium initially contains at least about 30 grams per liter of said metal to be precipitated.

9. The process of claim 7 wherein said medium moves countercurrently through said pieces.

* * * * *